United States Patent [19]
DiBella et al.

[11] 3,939,124
[45] Feb. 17, 1976

[54] FIRE-RETARDANT POLYURETHANE RESINS PREPARED FROM SIDE-CHAIN HALOGENATED AROMATIC POLYISOCYANATES

[75] Inventors: Eugene P. DiBella, Piscataway; Bernard Rudner, Ridgewood, both of N.J.

[73] Assignee: Tenneco Chemicals, Inc., Saddle Brook, N.J.

[22] Filed: Sept. 9, 1974

[21] Appl. No.: 504,401

[52] U.S. Cl. 260/77.5 AT; 260/2.5 AT; 260/2.5 AJ
[51] Int. Cl.². ......................................... C08G 18/76
[58] Field of Search ... 260/77.5 AT, 2.5 AT, 2.5 AJ

[56] References Cited
UNITED STATES PATENTS

| | | | |
|---|---|---|---|
| 3,250,749 | 5/1966 | Erickson et al. | 260/2.5 AT |
| 3,255,226 | 6/1966 | McShane | 260/77.5 AT |
| 3,497,542 | 2/1970 | Gardner et al. | 260/77.5 AT |

*Primary Examiner*—M. J. Welsh
*Attorney, Agent, or Firm*—Evelyn Berlow

[57] ABSTRACT

Polyurethanes are made fire-retardant by including in the reaction mixture aromatic polyisocyanates having halogen-containing side chains.

5 Claims, No Drawings

FIRE-RETARDANT POLYURETHANE RESINS PREPARED FROM SIDE-CHAIN HALOGENATED AROMATIC POLYISOCYANATES

This invention relates to flame-retardant polyurethane resins produced by the reaction of the side-chain halogenated aromatic polyisocyanates with polyols.

Polyurethane resins are acquiring increasing importance because they have properties that make them valuable in a variety of end uses. For example, rigid foams are used as construction boards and heat insulators, and semirigid and flexible foams are used in cushioning, shock absorption, and packaging applications. Unfoamed polyurethanes are used in coatings and as elastomers. In most of these applications, it is necessary that the material be fire-retardant. Unfortunately, most conventional polyurethane resins, and especially polyurethane foams, are highly flammable and have a tendency to melt and burn when exposed to high temperatures or to flames. This is particularly true of foams which are based wholly or partly on the usual commercial mixtures of 2,4- and 2,6-tolylene diisocyanates. Such foams burn rapidly and support combustion once ignited.

Many attempts have been made to reduce the flammability of both foamed and unfoamed polyurethane resins by blending fire-retardant additives therewith. Such attempts have met with limited success. While such additives as tris(2-chloroethyl) phosphate, tris(2,3-dibromopropyl) phosphate, ammonium phosphate, and antimony oxide reduce the flammability of polyurethane resins, the amounts of these additives that must be incorporated into the resins to render them acceptably fire resistant are so large that they have a deleterious effect on such physical and mechanical properties of the resins as dimensional stability, compression strength, and density. In addition, some of the proposed additives are not stable to heat or to humidity, while others tend to separate from the resin by crystallization or evaporation after a relatively short time, thus causing the resins to lose their fire-resistant qualities.

A more successful way of making polyurethanes fire-retardant involves the incorporation of a fire-retardant element into the polymer chain. For example, phosphorus-containing polyols or phosphonates have been used in polyurethane synthesis. The resulting fire-resistant resins frequently have poor aging properties under humid conditions because the phosphorus-oxygen-carbon linkages in them are readily hydrolyzed by water and by aqueous acids and bases.

In accordance with this invention, it has been found that polyurethane resins having improved resistance to burning and to flame propagation can be obtained by replacing a portion or all of the isocyanate component conventionally employed in the production of polyurethane resins with a side-chain halogenated aromatic polyisocyanate. The improved resistance to burning and flame propagation occurs both in the absence and in the presence of known flammability-retarding additives. when such additives are used, the desired level of flame retardance is achieved at substantially lower concentrations of the additives than was previously possible.

The side-chain halogenated aromatic polyisocyanates that are used in the production of the fire-retardant polyurethane resins of this invention have the structural formula

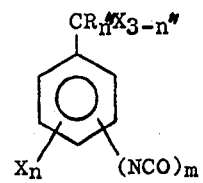

wherein each X represents chlorine or bromine; R represents hydrogen or the group

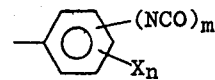

when R represents hydrogen, $m$ represents a number in the range of 2 to 3; when R represents the group

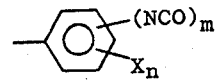

$m$ represents a number in the range of 1 to 3; and $n$ and $n''$ each represents a number in the range of 0 to 2. The following are illustrative of these side-chain halogenated polyisocyanates: 2,4-diisocyanatobenzotrichloride, 2,6-diisocyanatobenzotrichloride, 2,4-diisocyanato-5-chlorobenzotrichloride, 2,4-diisocyanato-6-chlorobenzotrichloride, 2,4-diisocyanatobenzyl chloride, 2,4,6-triisocyanatobenzal chloride, 2,4,6-triisocyanatobenzotrichloride, 2,4-diisocyanato-3,6-dichlorobenzotrichloride, 2,6-diisocyanato-4-chlorobenzotrichloride, 2,4-diisocyanatobenzotribromide, 2,6-diisocyanatobenzotribromide, 2,4-diisocyanato-6-bromobenzotribromide, 2,6-diisocyanatobenzyl bromide, 2,6-diisocyanatobenzal bromide, di(4-isocyanatophenyl)-dichloromethane, tris(4-isocyanatophenyl)chloromethane, di-(2,5-diisocyanatophenyl)dichloromethane, di-(3-chloro-4-isocyanatophenyl)dichloromethane, di(4-isocyanatophenyl)dibromomethane, tris-(2-bromo-4-isocyanatophenyl)bromomethane, and the like. The preferred side-chain halogenated aromatic polyisocyanates for use in the preparation of fire-retardant polyurethane resins are 2,4-diisocyanatobenzotrichloride, 2,6-diisocyanatobenzotrichloride, mixtures of the 2,4- and 2,6-diisocyanatobenzotrichlorides, and di(4-isocyanatophenyl)dichloromethane.

The side-chain halogenation of the polyisocyanates may be effected by procedures that are known in the art. For example, the chlorinated aromatic polyisocyanates may be prepared by the side-chain chlorination of the corresponding aromatic polyisocyanates. The side-chain chlorination may be effected by contacting the aromatic polyisocyanate with gaseous chlorine in the absence of a chlorination catalyst or in the presence of light or a side-chain chlorination catalyst, such as benzoyl peroxide or phosphorus pentachloride, at a temperature in the range of about 90° to 250°C., and preferably 100° to 150°C., until the desired amount of chlorine has reacted. When a tolylene diisocyanate is chlorinated in this way, the product obtained contains at least about 80% of the diisocyanatobenzotrichloride and small amounts of the corresponding diisocyanatobenzyl chloride, diisoycanatobenzal chloride, and ring-chlorinated diisocyanatobenzotrichlorides. When a mixture of tolylene diisocyanates is side-chain chlorinated, the product contains approximately the same ratio of isomers as the starting material. Thus, when a mixture of tolylene diisocyanates containing 80% of the 2,4-isomer and 20% of the 2,6-isomer is chlorinated, the product comprises a mixture of diisocyanatobenzotrichlorides containing about 80% of the 2,4-isomer and 20% of the 2,6-isomer.

Before they are used in the preparation of polyurethane resins, the side-chain chlorinated aromatic polyisocyanates are sparged with a dry gas, preferably air, at a temperature of at least 135°C. and/or distilled under reduced pressure to about 135°C. to remove from them hydrogen chloride and unreacted chlorine.

The fire-retardant polyurethane resins of this invention are prepared by reacting a polyisocyanate component that comprises a side-chain halogenated aromatic polyisocyanate with a polyol having at least two active hydrogen atoms. The compositions may be prepared by any known process. Suitable processes include the one-shot process, the total prepolymer process, the semi-prepolymer process, and modifications of these processes. In the one-shot procedure, the polyol, catalyst (and blowing agent and surfactants if foams are being produced) are blended together before being mixed with the isocyanate component. In the prepolymer processes, all or part of the polyol is mixed with the isocyanate before the catalyst, blowing agent, other additives, and any remaining polyol are added.

The polyisocyanate component used in the preparation of the polyurethane resins contains the amount of side-chain halogenated aromatic polyisocyanate that will impart to the resin the desired degree of fire-retardance without appreciably affecting its physical and mechanical properties. In most cases, about 10% to 100%, based on the weight of the polyisocyanate component, of side-chain halogenated aromatic polyisocyanate is used. The best combinations of fire-retardance and other properties are usually obtained when the polyisocyanate component contains about 30% to 80% by weight of side-chain halogenated aromatic polyisocyanate and about 20% to 70% by weight of aromatic polyisocyanate that is not side-chain halogenated.

Any of the conventional organic polyisocyanates can be used in combination with the side-chain halogenated aromatic polyisocyanates in the preparation of the fire-retardant polyurethane resins of this invention. Among the useful isocyanates are the following: 2,4-tolylene diisocyanate, 2,6-tolylene diisocyanate, tris(4-isocyanatophenyl)methane, di(4-isocyanatophenyl)methane, di(2,5-diisocyanatophenyl)methane, 2,4,6-tolyl triisocyanate, xylylene diisocyanate, naphthalene-1,5-diisocyanate, hexamethylene diisocyanate, 1,4-phenylene diisocyanate, polyphenylene polymethylene polyisocyanate, mixtures of these isocyanates, and the like.

Any of the polyols known to be suitable for preparing polyurethane resins can be used in preparing the fire-retarding resinous compositions of this invention. These polyols may be polyesters having terminal hydroxyl groups, hydroxyl-terminated polyethers, or mixtures thereof. The molecular weights of the polyols should be at least 500 and preferably between 750 and 10,000; their hydroxyl numbers should be between 15 and 700 and preferably between 30 and 60; and their acid numbers should be not greater than 50 and preferably below 2.

Suitable polyesters can be prepared by the condensation of a dicarboxylic acid, acid anhydride, or acid chloride with a polyhydric alcohol. The polyhydric alcohol is usually an aliphatic glycol, such as ethylene glycol, propylene glycol, 2,2-dimethylpropylene glycol, hexanediol-1,5, neopentyl glycol, or triethylene glycol, and the like or a mixture of such glycols with each other and/or with minor amounts of polyols having more than two hydroxyl groups, such as glycerol, trimethylolpropane, 1,2,5-hexanetriol, pentaerythritol, or sorbitol. Aromatic polyols, such as trihydroxymethylbenzene, can also be used. The polycarboxylic acids that can be used in the preparation of the polyesters include dicarboxylic acids and tricarboxylic acids that contain from two to about 36 carbon atoms. The preferred acids are dicarboxylic acids that contain from four to 12 carbon atoms, such as phthalic acid, isophthalic acid, terephthalic acid, cyclohexane-1,4-diacetic acid, adipic acid, succinic acid, azelaic acid, glutaric acid, maleic acid, fumaric acid, itaconic acid, and mixtures of these acids.

The useful polyethers include polyalkylene ethers, such as polyethylene glycols, polypropylene glycols, and the like as well as polyalkylene ether polyols prepared by reacting a polyol, such as glycerol, pentaerythritol, sorbitol, or sucrose, with a lower alkylene oxide, such as ethylene oxide, or propylene oxide.

The polyurethane resins of this invention may be rigid, semi-rigid, or flexible foams or they may be unfoamed resins.

When the resins are to be foams, any of the foaming agents known to be useful for this purpose, such as water, halogenated hydrocarbons, and mixtures thereof, may be used. Any of the catalysts that are commonly used in the preparation of polyurethane resins may be present in the reaction mixture. These include metallic salts, teritiary amines, and mixtures thereof, for example, stannous octoate, dibutyltin laurate, N-methylmorpholine, triethylene diamine, and triethylamine. In addition, a foam stabilizer or surfactant, for example, polydimethyl siloxane, sulfonated castor oil, oxyethylated sorbitan monopalmitate, or oxyethylated polypropylene glycol, may be present during the polyurethane-forming reaction.

If desired, a small amount of a flammability-retarding additive may be incorporated into the resin to further improve its fire-resisting properties. Suitable additives include tris(2-chloroethyl) phosphate, tris(2,3-dibromopropyl) phosphate, ammonium phosphate, hexabromobutene, antimony oxide, dibromoneopentyl glycol, dialkyl N,N-dimethyl phosphoramidates, and the like.

In addition to the aforementioned ingredients, the polyurethane resin compositions of this invention may contain fillers, stabilizers, pigments, dyes, other resins, and the like, in the amounts ordinarily employed for these purposes.

The invention is further illustrated by the following examples.

EXAMPLE 1

Two hundred grams of a mixture of tolylene diisocyanates which contained 80% of the 2,4-isomer and 20% of the 2,6-isomer and which boiled at 85°–92°C./0.5mm. was side-chain chlorinated by passing chlorine over its surface while it was maintained at a temperature in the range of 110°–120°C. until 288 grams (4.06 moles) of chlorine had been added. The chlorination was catalyzed by light from a 100 watt tungsten lamp. The chlorinated material was sparged with dry air at 135°–140°C. to remove hydrogen chloride and unreacted chlorine from it. There was obtained 317.6 grams of a product that had a density at 25°C. of 1.5514 and a chlorine content of 39.1% (calculated 38.5%) It contained about 80% by weight of a mixture of 2,4- and 2,6-diisocyanatobenzotrichlorides and small amounts of reaction by-products including 2,4- and 2,6-diisocyanatobenzyl chlorides, 2,4- and 2,6-diisocyanatobenzal chlorides, and ring-chlorinated 2,4- and 2,6-diisocyanatobenzotrichlorides.

EXAMPLE 2

A mixture of tolylene diisocyanates which contained 80% of the 2,4-isomer and 20% of the 2,6-isomer (3917 grams; 22.5 moles) was stirred and heated at 105°–125°C. while chlorine was passed over its surface. The chlorination, which was catalyzed by light from a 150 watt tungsten lamp, was continued until the weight of the reaction mixture had increased by 2558 grams.

The crude side-chain chlorinated product was heated at 135°–145°C. and sparged with dry air to remove hydrogen chloride and unreacted chlorine from it. It was then treated with activated carbon. The purified product, which was a clear reddish viscous oil, was subjected to overhead distillation at 150°–184°C./0.3 – 1.0 mm. The distillate was a clear, straw-colored syrupy liquid that contained 36.5% C, 0.86% H, 9.37% N, and 39.9% Cl (calculated for $C_9H_3O_2N_2Cl_3$: 39.0% C, 1.08% H, 10.1% N, and 38.5% Cl) and that had a density at 25°C. of 1.568 and a color (APHA) of 500.

The infrared spectrum of the product showed the presence of NCO groups and the absence of the aliphatic C—H linkage. Anayltical data obtained by gas chromatography indicated that the product contained at least 88% of 2,4- and 2,6-diisocyanatobenzotrichlorides and small amounts of ring-chlorinated 2,4- and 2,6-diisocyanatobenzotrichlorides.

EXAMPLE 3

A polyurethane resin was prepared by the following procedure:

A mixture of 200 grams of a polyether that had a hydroxyl number of 56 (Polyol LG-56), 2.5 grams of a silicone surfactant (DC 192), 0.6 gram of triethylenediamine (Dabco 33-LV) and 7.4 grams of water was homogenized for 4.5 minutes. After the addition of 0.5 gram of stannous octoate, the mixture was homogenized for 30 seconds. Then 155 grams of the product of Example 2 was added, and after homgenization for 5 seconds the mixture was poured into a mold and allowed to rise. The resulting foam was cured in a circulating air oven at 150°C. for 5 minutes, cut into 6 inches × 2 inches × 0.5 inch specimens, and tested for flammability.

For comparative purposes, corresponding polyurethane foams were prepared using a commercially-available mixture of tolylene diisocyanates (80/20 mixture of 2,4- and 2,6-isomers).

Unlike the comparative foams which burned rapidly, the foam prepared from the side-chain chlorinated tolylene diisocyanate burned very slowly without flaming drips.

EXAMPLE 4

When the procedure described in Example 3 was repeated using as the polyisocyanate component a mixture containing equimolar amounts of the product of Example 2 and a mixture of tolylene diisocyanates (80/20 mixture of 2,4- and 2,6-isomers), the polyurethane foam obtained burned very slowly and had physical and mechanical properties equivalent to those of the foam prepared from tolylene diisocyanates that had not been side-chain chlorinated.

EXAMPLE 5

When the procedure described in Example 3 was repeated using as the polyisocyanate component a mixture of 2,4- and 2,6-diisocyanatobenzotribromide, similar results were obtained.

EXAMPLE 6

When a polyisocyanate component comprising a mixture containing 80% by weight of the product of Example 2 and 20% by weight of tolylene diisocyanates (80/20 mixture of 2,4- and 2,6-isomers) was used in the preparation of a linear polyurethane elastomer, the product obtained was far more resistant to burning than the corresponding elastomer prepared from tolylene diisocyanates that had not been side-chain chlorinated.

Each of the other side-chain halogenated aromatic polyisocyanates disclosed herein can be used in a similar manner to impart fire-retardance to polyurethane resins.

What is claimed is:

1. A fire-retardant polyurethane resin that comprises the reaction product of a polyisocyanate component containing from about 30% to 80% by weight of a side-chain halogenated aromatic polyisocyanate selected from the group consisting of 2,4-diisocyanatobenzotrichloride, 2,6-diisocyanatobenzotrichloride, and mixtures thereof and a polyol having at least two active hydrogen atoms selected from the group consisting of polyether polyols, polyester polyols, and mixtures thereof.

2. A fire-retardant polyurethane resin as defined in claim 1 wherein the polyisocyanate component contains from 20% to 70% by weight of a polyisocyanate selected from the group consisting of 2,4-tolylene diisocyanate, 2,6-tolylene diisocyanate, and mixtures thereof.

3. A fire-retardant polyurethane resin as defined in claim 1 wherein the polyol is a polyether.

4. A fire-retardant polyurethane resin as defined in claim 1 wherein the polyisocyanate component contains equimolar amounts of (a) a side-chain halogenated polyisocyanate selected from the group consisting of 2,4-diisocyanatobenzotrichloride, 2,6-diisocyanatobenzotrichloride, and mixtures thereof and (b) a polyisocyanate selected from the group consisting of 2,4-tolylene diisocyanate, 2,6-tolylene diisocyanate, and mixtures thereof.

5. A fire-retardant polyurethane resin as defined in claim 1 wherein the polyisocyanate component comprises from 30% to 80% by weight of a mixture of diisocyanatobenzotrichlorides containing about 80% of the 2,4-isomer and 20% of the 2,6-isomer.

* * * * *